United States Patent Office 3,200,162
Patented Aug. 10, 1965

3,200,162
PROCESS FOR THE ISOMERIZATION OF XYLENES
Masakazu Kawai, Sakai-shi, Japan, assignor to Maruzen Oil Company, Limited, Osaka, Japan, a corporation of Japan
No Drawing. Filed Oct. 22, 1962, Ser. No. 232,284
Claims priority, application Japan, Oct. 30, 1961, 36/39,116
9 Claims. (Cl. 260—668)

The present invention relates to a process for the isomerization of xylenes.

According to the present invention, theere are provided a process for the isomerization of xylenes which comprises contacting the xylene mixture containing at least any one of three xylene isomers less than its equilibrium concentration with a clay type catalyst or synthetic silica-alumina catalyst (hereinafter referred to as silica-alumina type catalyst) which is previously heat-treated at a temperature of about 500 to 700° C. in the presence of steam for about 5 to 30 hours, in the presence of 0.01 to 0.15 mol of water per mol of the xylene mixture.

It is well known fact that a xylene mixture normally contains three xylene isomers, that is, o-xylene, m-xylene and p-xylene, and ethylbenzene, and that the state of equilibrium which depends on the temperature is formed along these four components. According to the literature, J. Research Natl. Bur. Standards, 37, 95 (1946), for example, the equilibrium composition at the temperature of 450° C. (842° F.) is as follows:

| Component | Ethylbenzene | o-Xylene | m-Xylene | p-Xylene |
|---|---|---|---|---|
| Composition (mol percent) | 8.8 | 22.5 | 47.4 | 21.3 |

The following is the equilibrium composition only among the three xylene isomers in the above equilibrium mixture.

| Component | o-Xylene | m-Xylene | p-Xylene |
|---|---|---|---|
| Composition (mol percent) | 24.7 | 52.0 | 23.3 |

According to the present invention, the equilibrium composition may be approached from any other composition of the respective isomers. That is, o-xylene and/or m-xylene may be converted to p-xylene, o-xylene and/or p-xylene to m-xylene, or m-xylene and/or p-xylene to o-xylene.

The state of equilibrium has been formed among the ethylbenzene and the three xylene isomers, but at least in the isomerization process wherein silica-alumina type catalyst is used, isomerization rates of ethylbenzene to xylene isomers and of xylene isomer to ethylbenzene are extremely slow, and therefore it appears that this equilibrium does not exist. On the other hand, the equilibrium among three xylene isomers definitely exists, and therefore it will be all right only to take equilibrium among three xylene isomers into consideration for practical purposes.

Since the silica-alumina type catalyst is originally and mostly used as a cracking catalyst, while it has an activity for isomerization, it has very strong activities for cracking and disproportionation reactions. Because of this, in case the isomerization is aimed at, for example, various processes such as a process wherein pre-treated catalyst is used, a process wherein a tertiary substance is made to coexist during the isomerization reaction, etc. have heretofore been suggested.

We have already found that the use of the silica-alumina type catalyst for isomerization should be considered separately for its isomerization activity and its side reaction activity and that while the side reaction activity is very sensitive even to a slight change of the properties of catalyst resulting from the pre-treatment of catalyst, or to the presence of tertiary substances, etc., and the activity decreases comparatively rapidly in accordance with the period of its actual use, the isomerization activity is comparatively insensitive to them and it tends to rather increase.

In case the silica-alumina type catalyst is generally used for the isomerization reaction as a main object, therefore, it is necessary to increase a yield of $C_8$ aromatic hydrocarbons i.e. xylene mixture by the restraint of side-reaction activity and to maintain a high isomerization ratio (that is a ratio of content of aimed xylene isomer in isomerized xylene mixture to theoretical content of aimed xylene isomer in the equilibrium state) by maintaining the isomerization activity as high as possible.

As a result of making further study on the basis of the aforesaid knowledge, we have now found that much higher yield of xylene mixture and isomerization ratio than the prior processes can be obtained by contacting the raw material with a silica-alumina type catalyst which is previously heat-treated at a temperature of about 500 to 700° C. in the presence of steam for about 5 to 30 hours, in the presence of very small quantity of water, namely 0.01 to 0.15 mol per mol of said raw xylene mixture. The process in which the catalyst is previously heat-treated in the presence of steam was already described in U.S. Patent No. 2,775,628 specification, but according to said process, the isomerization is carried out by contacting a xylene mixture with a silica-alumina type catalyst which is pre-treated at a temperature of 1000 to 1400° F. in the presence of steam for 50 to 100 hours, in the presence of hydrogen. According to the present invention which is different from the above process, very high isomerization ratio and yield of xylene mixture can be obtained by only previous heat-treatment of the catalyst in the presence of steam and at a temperature of about 500 to 700° C. for about 5 to 30 hours, when a small quantity of water, namely 0.01 to 0.15 mol of water per mol of the raw material is coexisted during the reaction.

However, it is desirable that the quantity of water to be added to the raw material in this case do not exceed 0.15 mol per mol of the raw material, as the effect of the addition of water is reduced instead of increased, if its quantity exceed that limit. Because, it is considered that the side reaction activity of the catalyst is more restrained as the quantity of water added thereo is increased, but the isomerization activity of the catalyst would be reduced likewise.

As aforesaid, we accomplished a superior isomerization process which is not observed in the prior processes, by combining a process of pre-treating the catalyst in the presence of steam with a process in which very small quantity of water is added during the isomerization reaction.

When the present invention is applied for industrial processes, the advantages are as follows:

(1) The pre-treating temperature of silica-alumina type catalyst is about 500 to 700° C. and the treating time is a short time of about 5 to 30 hours, therefore an apparatus for which the pre-treatment of catalyst is carried out is not separately necessary.

Namely in an industrial process, if steam is used in the warming up of apparatus which is previously carried out at the start of running, the activity of catalyst is freely changed by suitably regulating the time of warming up of apparatus and the temperature.

(2) Special substances such as hydrogen during the reaction are not necessary.

(3) Since the substance which is made to coexist during the reaction is water and its quantity is very small, the separation of water is carried out in the distillation step simultaneously with the separation of small quantity of by-product which is contained in the product by the isomerization.

When the quantity of water coexisted is large, the separation of water should be carried out by cooling and condensing the product by the isomerization, but according to the present invention, the quantity of water coexisted is small and thus the separation of water is not necessary, the apparatus is considerably simplified and so the heat may be remarkably economized in subsequent distillating step.

As described above, the pre-treating conditions of silica-alumina type catalyst which is carried out in the presence of water according to the present invention are as follows:

Temperature ____ 500–700° C., particularly 570–670° C.
Time _____ 5–30 hrs., particularly 10–20 hrs.

And further the conditions of isomerization reaction are as follows:

Reaction temperature _____ 400–600° C., particularly 450–550° C.
Reaction pressure _____ Optionally, particularly atmospheric pressure.
Liquid space velocity _____ 0.2–2 v./v./hr., particularly 0.5–1.5 v./v./hr.
Quantity of water supplied_ 0.01–0.15 mol, particularly 0.05–0.12 mol per mol raw xylene mixture.

The separation of any specific xylene isomer from isomerized xylene mixture produced by the present invention can be carried out by any known processes. For example, p-xylene is effectively separated by crystallization and o-xylene is separated by fractionation from said xylene mixture.

In order to clarify the outline of the present invention, the typical examples of the present invention and comparative examples are shown as follows:

The percentage of composition of raw xylene mixture which is used in the examples and the percentage of composition only among the three xylene isomers in the raw material are as follows:

| Component | Composition of raw material (mol percent) | Percentage of three xylene isomers in raw material (mol percent) |
| --- | --- | --- |
| Ethylbenzene | 15.0 | |
| o-Xylene | 26.7 | 31.4 |
| m-Xylene | 50.8 | 59.8 |
| p-Xylene | 7.5 | 8.8 |

EXAMPLE 1

The aforesaid raw xylene mixture whose p-xylene content is less than the equilibrium concentration was introduced into a reactor packed with a synthetic silica-alumina type catalyst which is previously heat-treated at the temperature of 550° C. and in the presence of steam for 20 hours, at the liquid space velocity of 1.0 v./v./hr. under atmospheric pressure at the temperature of 450° C., and at the same time water was supplied at the rate of 0.03 mol per mol of raw material and isomerization reaction was made to take place.

The composition among the three xylene isomers contained in the reaction product obtained as a result of the above operation, and the yield of xylene mixture including ethylbenzene are shown in the following Table 1.

Table 1

| Percentage of composition of three xylene isomers (mol percent) | | | Yield of xylene mixture (mol percent) |
| --- | --- | --- | --- |
| o-Xylene | m-Xylene | p-Xylene | |
| 25.1 | 51.9 | 23.0 | 97.5 |

EXAMPLE 2

Reaction was carried out under the same conditions as that in Example 1 except that 0.1 mol of water per mol of raw material was supplied. The results were shown in the following Table 2.

Table 2

| Percentage of composition of three xylene isomers (mol percent) | | | Yield of xylene mixture (mol percent) |
| --- | --- | --- | --- |
| o-Xylene | m-Xylene | p-Xylene | |
| 25.2 | 52.0 | 22.8 | 97.7 |

EXAMPLE 3

Reaction was carried out under the same conditions as that in Example 1 except that synthetic silica-alumina catalyst which is previously heat-treated at the temperature of 650° C. in the presence of steam for 10 hours was used. The results were shown in the following Table 3.

Table 3

| Percentage of composition of three xylene isomers (mol percent) | | | Yield of xylene mixture (mol percent) |
| --- | --- | --- | --- |
| o-Xylene | m-Xylene | p-Xylene | |
| 25.0 | 52.1 | 22.9 | 97.6 |

COMPARATIVE EXAMPLE 1

Reaction was carried out under the same conditions as that in Example 1 except that the pre-treatment of synthetic silica-alumina catalyst was not carried out. The results were shown in the following Table 4.

Table 4

| Percentage of composition of three xylene isomers (mol percent) | | | Yield of xylene mixture (mol percent) |
| --- | --- | --- | --- |
| o-Xylene | m-Xylene | p-Xylene | |
| 26.3 | 52.3 | 21.4 | 86.3 |

COMPARATIVE EXAMPLE 2

Reaction was carried out under the same conditions as that in Example 1 except that 0.5 mol of water per mol of raw material was supplied. The results were shown in the following Table 5.

Table 5

| Percentage of composition of three xylene isomers (mol percent) | | | Yield of xylene mixture (mol percent) |
| --- | --- | --- | --- |
| o-Xylene | m-Xylene | p-Xylene | |
| 27.9 | 52.8 | 19.3 | 98.5 |

COMPARATIVE EXAMPLE 3

Reaction was carried out under the same conditions as that in Example 1 except that the synthetic silica-alumina catalyst which was previously heat-treated in the presence of steam at the temperature of 800° C. for 5 hours. The results were shown in the following Table 6.

*Table 6*

| Percentage of composition of three xylene isomers (mol percent) | | | Yield of xylene mixture (mol percent) |
|---|---|---|---|
| o-Xylene | m-Xylene | p-Xylene | |
| 28.3 | 55.5 | 16.2 | 98.8 |

I claim:

1. A process for the isomerization of xylenes which comprises contacting a xylene mixture containing at least one of three xylene isomers in less than its equilibrium concentration in the presence of 0.01 to 0.15 mol of water per mol of the raw xylene mixture with a silica-alumina type catalyst which is previously heat-treated at a temperature of 500° to 700° C. in the presence of steam for 5 to 30 hours.

2. A process according to claim 1 further characterized in that the isomerization reaction is carried out at a temperature of 400 to 600° C. and at a liquid space velocity of 0.2 to 2 v./v./hr.

3. A process according to claim 1 wherein the isomerization reaction is carried out at a temperature of 450 to 550° C. and at a liquid space velocity of 0.5 to 1.5 v./v./hr. and in the presence of 0.05 to 0.12 mol of water per mol of the raw xylene mixture 4. A process according to claim 1 wherein the silica-alumina type catalyst is previously heat-treated at a temperature of 570 to 670° C. in the presence of steam and for 10 to 20 hours.

5. A process for the production of p-xylene by isomerization from a xylene mixture containing p-xylene in lower concentration than that of its equilibrium state which comprises contacting the xylene mixture in the presence of 0.01 to 0.15 mol of water per mol of the raw xylene mixture with a silica-alumina type catalyst which is previously heat-treated at a temperature of 500° to 700° C. in the presence of steam for 5 to 30 hours, and recovering substantially pure p-xylene from the resultant mixture approaching equilibruim concentration of p-xylene.

6. A process for the production of o-xylene by isomerization from a xylene mixture containing o-xylene in lower concentration than that of its equilibrium state which comprises contacting the xylene mixture in the presence of 0.01 to 0.15 mol of water per mol of the raw xylene mixture with a silica-alumina type catalyst which is previously heat-treated at a temperature of 500° to 700° C. in the presence of steam for 5 to 30 hours, and separating substantially pure o-xylene from the resultant mixture approaching equilibrium concentration of o-xylene.

7. A process for the production of p-xylene and o-xylene by isomerization from a xylene mixture containing p-xylene and o-xylene in lower concentrations than that of their equilibrium compositions which comprises contacting the xylene mixture in the presence of 0.01 to 0.15 mol of water per mol of the raw xylene mixture with a silica-alumina type catalyst which is previously heat-treated at a temperature of 500° to 700° C. in the presence of steam for 5 to 30 hours, separating substantially pure o-xylene by fractionation from the resultant mixture approaching equilibrium concentration of p-xylene and o-xylene, and then recovering substantially pure p-xylene from the remnant mixture by crystallization.

8. A process in accordance with claim 2, wherein the isomerization reaction is carried out at a temperature of 450 to 550° C. and at a liquid space velocity of 0.5 to 1.5 v./v./hr. and in the presence of 0.05 to 0.12 mol of water per mol of the raw xylene mixture.

9. A process of isomerizing xylene which consists essentially in contacting a xylene mixture containing at least one of the three xylene isomers in less than its equilibrium concentration, in the presence of 0.01 to 0.15 mol of water per mol of the xylene mixture, and in the presence of a silica-alumina type catalyst which has been subjected to the action of steam at a temperature of 500 to 700° C. for about 5 to 30 hours.

References Cited by the Examiner

UNITED STATES PATENTS 2,775,628   12/56   Nicholson et al. _____ 260—668

ALPHONSO D. SULLIVAN, *Primary Examiner.*